United States Patent [19]

Biró

[11] Patent Number: 4,565,556

[45] Date of Patent: Jan. 21, 1986

[54] MOLECULAR AND ISOTOPIC FRACTIONATING PROCESS AND APPARATUS

[75] Inventor: Ladislao J. Biró, 1567 Conde, Buenos Aires, Argentina

[73] Assignee: Ladislao José05 Biró, Argentina

[21] Appl. No.: 456,987

[22] Filed: Jan. 10, 1983

[30] Foreign Application Priority Data

Jan. 12, 1982 [AR] Argentina .............................. 288105

[51] Int. Cl.$^4$ .............................................. B01D 45/12
[52] U.S. Cl. .......................................... 55/460; 55/17; 55/205
[58] Field of Search ..................... 55/17, 66, 277, 205, 55/460

[56] References Cited

U.S. PATENT DOCUMENTS

| | | | |
|---|---|---|---|
| 3,273,325 | 9/1966 | Gerhold | 55/17 X |
| 3,299,616 | 1/1967 | Lucas | 55/17 |
| 3,460,318 | 8/1969 | Creutz | 55/17 |
| 3,859,205 | 1/1975 | Roba et al. | 55/17 X |
| 3,922,871 | 12/1975 | Bolesta | 55/17 X |
| 4,135,898 | 1/1979 | Rosengard | 55/17 X |
| 4,162,901 | 7/1979 | Enegess | 55/17 |
| 4,276,068 | 6/1981 | Laussermaier et al. | 55/17 X |
| 4,278,550 | 7/1981 | Watts | 55/17 X |

FOREIGN PATENT DOCUMENTS

| | | | |
|---|---|---|---|
| 2505864 | 10/1976 | Fed. Rep. of Germany | 55/17 |
| 1375154 | 8/1963 | France | 55/17 |
| 7532643 | 9/1980 | France . | |

Primary Examiner—Robert Spitzer

[57] ABSTRACT

Disclosed is a molecular and isotopic fractionating process for gaseous mixtures, and apparatus wherein said process may be carried out.

The gas mixture to be fractionated is subjected in the inside of a chamber to a helicoidal path and interfered in its free circulation by means of aerodynamic elements, to obtain fractions of different weights.

4 Claims, 6 Drawing Figures

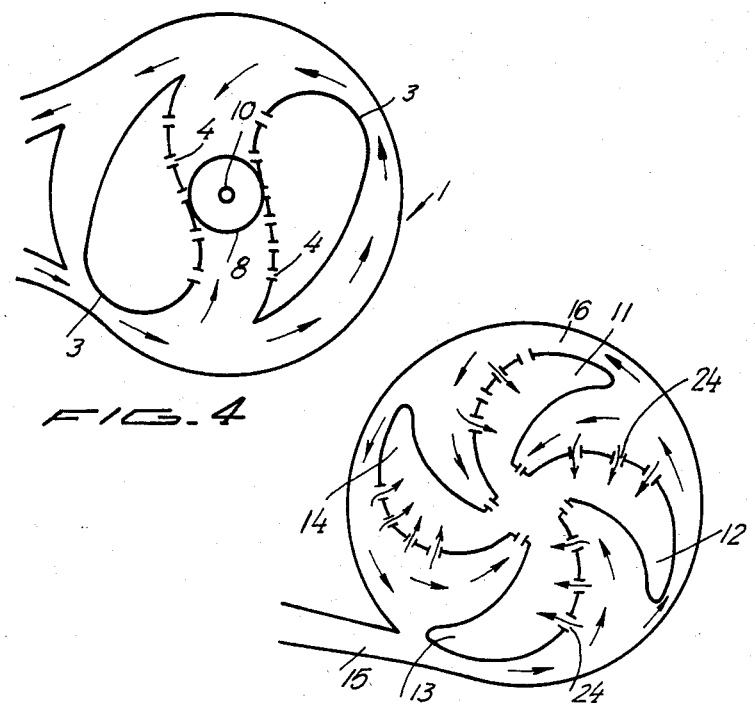
FIG. 4
FIG. 5
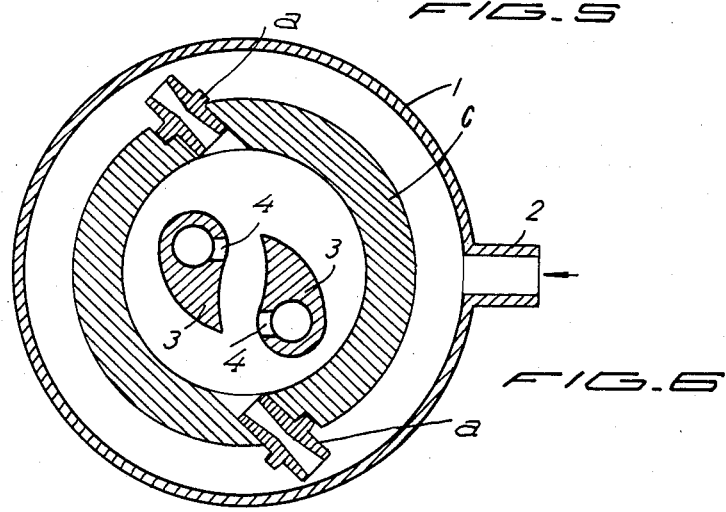
FIG. 6

MOLECULAR AND ISOTOPIC FRACTIONATING PROCESS AND APPARATUS

BACKGROUND OF THE INVENTION

The present invention relates to a molecular and isotopic fractionning process, and to apparatus wherein said process may be carried out.

Hitherto several methods for separating molecular and isotopic mixtures are known, and particularly concerning isotopes and more specifically uranium; they are carried out in gaseous phase in appropriate devices by means of spreading or centrifugating or else through tuyeres.

The gaseous spread method is based on the speed difference in the gaseous fluid passage through a porous wall. This method has the disadvantage of requiring a high energy consumption and large plants.

In the gaseous-phase centrifugating process, fractionning is achieved through the centrifugal field which enriches the system in the heaviest component at the widest radial zone. In this case, however, besides the high energy consumption, expensive and complex equipments are required, and the centrifugal machine rotator must always hang within a magnetic field. Said centrifugal machine comprises a cylindric, thin-wall rotator rotating inside a shell at a speed close to 400 mts/sec. The gaseous feed is injected in the rotator near the center and the product and residue are continuously discharged through the upper and lower portions, respectively. The adequate design, equilibrating and maintenance of the rotator in this type of device presents a hard-to-solve problem.

The fractionnning process performed by means of tuyeres is based on diverting a gas stream which spreads throughout a curved wall. The thus created centrifugal field causes fractioning to take place. This process in practice requires a great number of micrometrical and highly accurate tuyeres for a given plant, with subsequent complications and high costs. In addition, a plant of this type requires great energy availability to recompress the gas which is spread in each separating step and counterbalance the losses produced by viscous friction. The development of this process is known to having achieved a diminution in the original costs, but cannot be exploited on a large scale.

French Pat. No. 75 32643 describes a device characterized by having on the side surface of a cylindric container a plurality of injection openings connecting the inside of said container with a pressured gaseous mixture source, and housing means for a first gaseous mixture fraction escaping through at least one extraction opening.

SUMMARY OF THE INVENTION

The process for the fractioning of gases which is an object of the present invention is based on subjecting the gas mixture to be fractionned to processing in fluidodynamic devices without movable parts, which process comprises the steps of: introducing the gaseous mixture at high speed or different speeds, preferably sonic or at least close to sonic speed, through one or more non-radial tuyeres into a variable or non-variable section chamber, preferably circular or cylindricoconic axial, preferably of cylindric development, and causing the fluid inside the chamber to assume a helicoidal path. In this process, the masses and force fields created in a fluid while moving, depending on continuous or sectionally continuous, winding and/or helicoidal and/or circular trajectories and/or combinations thereof are employed for inducing separation phenomena.

The invention also comprises various devices for carrying out the above process.

DETAILED DESCRIPTION OF THE INVENTION

The process which has been developed is characterized by the steps of: (a) injecting the gaseous mixture through one or more tuyeres disposed in directions forming together with the chamber radius, an angle comprised within 60° and 120°, or more particularly about 90°, at high, preferably sonic speed, or different speeds, into a substantially cylindrical chamber; (b) changes said gaseous mixture to form a helicoidal path which is accelerated towards a central zone, the outer marginal portion moving around the chamber axis along the cylindrical wall thereof, said outer portion being enriched through thus created centrifugal forces by a heavier component and the inner marginal portion of the circulating gaseous stream, by a relatively lighter component of the mixture, (c) subjecting the inner marginal portion of the circulating stream near the chamber axis to further acceleration produced by the combined action of aerodynamic elements disposed within the cylindrical chamber, and suctionning from holes located at the adjacent inner faces of said elements; the circulating stream near the axis, already enriched in the lightest component of the mixture, being accelerated by the aerodynamic elements, the centrifugal force field being thus enhanced, and said stream being further enriched in its minor radius portions in the lightest component; this central flow portion penetrating in the zone located between the said elements, and being isolated by pressure difference through the holes; and (d) extracting through a second chamber outlet located in its opposite peripheral portion the outer marginal portion of the gaseous stream which is enriched in a relatively heavier component thereof.

More particularly, the process which is the object of the invention is carried out by the molecular and isotopic fractionning of gaseous mixtures in a fractionning chamber, which process consists in: (i) introducing the gaseous mixture at one or more different speeds into a chamber through one or more having non-radial directions; tuyeres in a generally tangential direction (ii) causing said gaseous mixture inside the chamber to assume a helicoidal path; and (iii) interferring with the free circulation of the mixture by means of aerodynamic elements so to cause pulsations within said mixture of continuously variable pressures and speeds; (b) guide the lightest portion of the gaseous mixture; toward an inner portion of said container (c) isolate said lighest fraction at the interior of said container by pressure difference, and (d) controlling the inner marginal layer of said portion to avoid turbulences; and (iv) separately extracting the fractions from the chamber.

The above process can be carried out in several appropriate devices.

The appended drawings illustrate said devices without limiting the devices which can be employed to carry out the process according to the invention.

FIG. 4 is a schematic view which illustrates the fluid movement in the device of FIG. 2.

Figures 1, 2, 3:
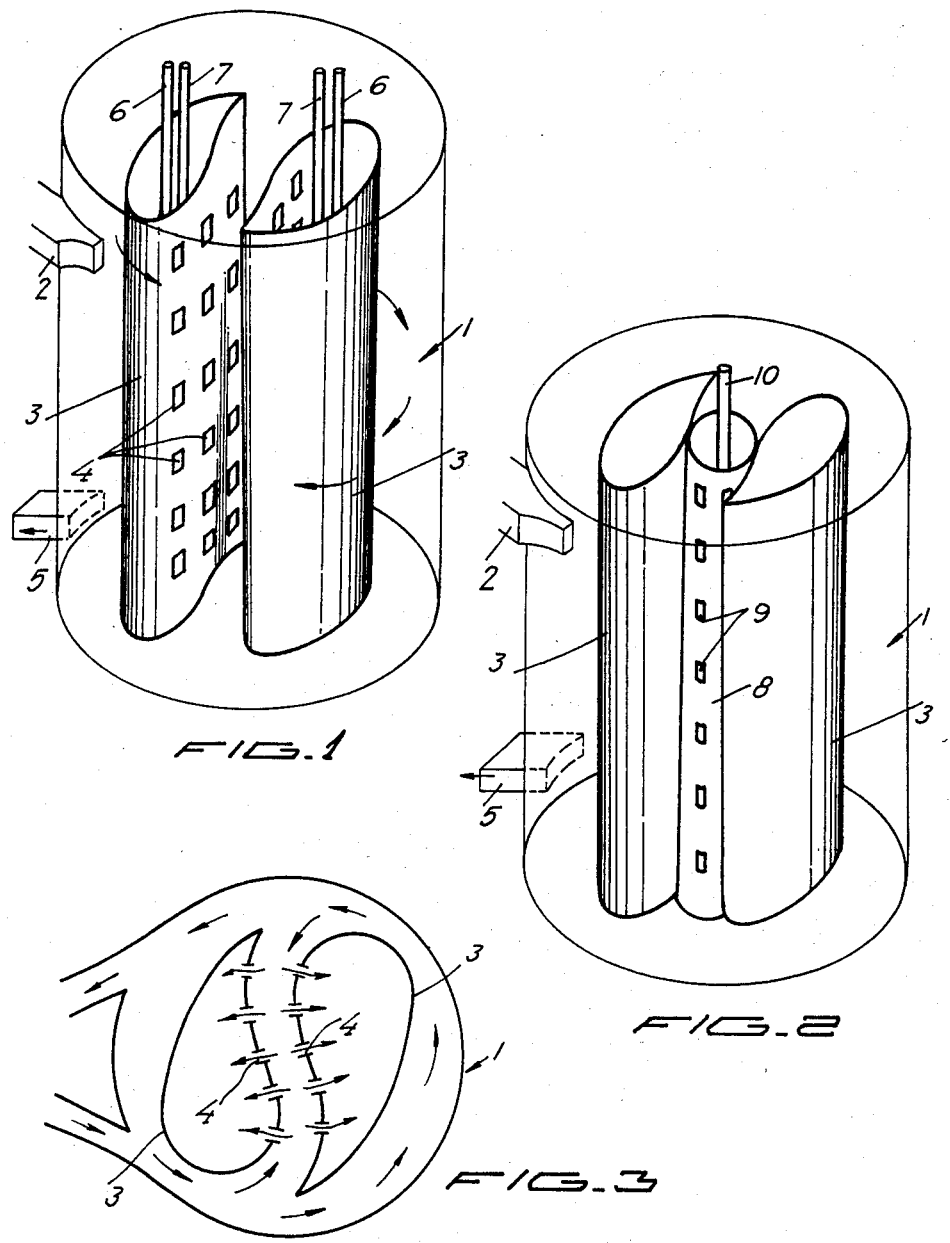
FIG. 1 illustrates a device wherein the lightest component of the mixture to be separated is recovered through two aerodynamic profiles with holes being located at the inner central portion of the respective profiles.
FIG. 2 shows a device similar to that of FIG. 1 wherein the absorption is effected through a central tube provided with holes, this tube being disposed between both profiles.
FIG. 3 is a schematic view which illustrates the fluid movement in the device of FIG. 1.

FIG. 5 is a schematic view of the fluid movement in a device wherein instead of two profiles, there have been provided four profiles indicated by reference numbers 11 to 14, respectively and wherein the fluid is injected into chamber 16 through the injection tuyeres and suctionned through holes 24. Of course, this Figure illustrates an embodiment having more than two profiles, three profiles, for instance, being also possible.

FIG. 6 illustrates a device provided with more than one tuyere and a lining, the latter being optional in the embodiment.

FIG. 1 represents a device having an approximately cylindric tube 1 containing two aerodynamic profiles indicated by reference number 3, which profiles are axially arranged, the tube being provided with a gas injection tuyere indicated by reference number 2 and an outlet channel indicated by reference number 5 whereby the heaviest fraction of the component is discharged.

From the upper and/or lower lids of the tube 1 there emerge inner lines for suctionning the fluid which is enriched with the lightest mixture component and which have been indicated by general reference numbers 6 and 7.

Profiles 3 in their inner portion are provided with holes 4 for the admission of lighter gas into the profiles.

FIG. 2 illustrate a device wherein an intermediate tube indicated by reference number 8 has been disposed between two profiles each shown by reference number 3, the intermediate tube 8 being provided with holes 9 for the outlet of the lighter gas. The fluid is injected in the embodiment of FIGS. 1 and 2 in a non-radial, for instance, tangential form in relation to the cylinder through tuyere 2 in such a manner that at the throat thereof it achieves a high speed, effecting then a curvature trajectory of identical configuration along the entire said wall of cylinder 1.

This injection, eventually together with the suctionning at the outlet channel assures the creation of a helicoidal fluidodynamic conformation which is co-axial in relation to the cylinder axis. The centrifugal force which is generated tends to concentrate the lightest component of the gas mixture near the chamber axis and the heaviest component near the outer wall thereof. Due to the maintenance of the angular impulse of gas injection in the helicoidal conformation which is generated, an augmentation of the tangential speed in accordance with the diminution of the radius is achieved, which produces a radial gradient of tangential strengths and a corresponding radial strength gradient which suctions lighter components of the fluid towards the cylinder center. In the proposed devices the fluid effecting a stratified helicoidal movement is subjected in the central portion of the chamber to a further acceleration by means of profiles 3 and by the suctionning transmitted through the holes of the intermediate zone between the profiles. The fluid from the central portions is deviated by the COANDA effect along the profile, whilst the suction-induced pressure gradient favourably controls the corresponding phenomena of the marginal layer. Under these conditions, the lightest portion is suctionned through holes 4 (in the device of FIG. 1) and holes 9 (in the device of FIG. 2). The heaviest fraction goes on with its helicoidal trajectory and at successive meetings with the profiles reproduces the above mentioned fractionning. The central tube in FIG. 2 is provided with an outlet 10 for the light portion.

FIG. 6 shows a device wherein there are provided more than one tuyere a, an optional lining being present, which lining is indicated with reference c. This lining plays the only roll of matching the inlet pressures at the respective tuyeres.

Hereinbelow an experiment effected with the tube having a nucleus with aerodynamic profiles as that represented in FIG. 2 is described. A hydrogen/methane mixture was subjected to passage through the device and the gases at both outlets were analyzed with a gas cromatograph Varian 1080.

The variation of the peaks areas corresponding to hydrogen and methane served as the composition variation index. The result is given below, wherein R represents the relation and subindexes i and e indicate the inner and outer outlets respectively (in which outer outlet enrichment in the component of higher molecular weight is expected):

(Under injection pressure of 2.5 and 2 atm., respectively)

| Experiment 1 | $R_i = 4.7$ |
| --- | --- |
|  | $R_e = 3.9$ |
|  | Difference = 22% |
| Experiment 2 | $R_i = 4.6$ |
|  | $R_e = 4.1$ |
|  | Difference = 12% |

It should be noted that in those devices illustrated in FIGS. 1 and 2, lines 6 and 10 can be eliminated and, in their place, an opening on the corresponding face or base of cylinder 1 can be introduced coincidentally with profiles 3 or tube 8.

We claim:

1. A device for the molecular and isotopic fractionating of gaseous mixtures comprising a substantially cylindrical chamber provided with at least one tuyere disposed near one end thereof to tangentially introduce gaseous mixture thereinto, an exhaust port in said chamber disposed near the opposite end thereof to tangentially remove heavy fractions from said chamber, at least two diametrically opposed hollow fixed aerodynamically shaped profile members having rounded longitudinal surfaces tapering to thin longitudinal edges, said members being longitudinally disposed within said chamber and extending substantially throughout the length thereof to direct said gaseous mixture in a helicoidal path outside of and between said profiles and cause pulsations, thereby guiding light fractions of said gaseous mixture toward the inner portion of said chamber, said profiles being provided on the inner opposed side walls thereof with holes for receiving said light fractions, and means for removing said light fractions from the inner portion of said chamber.

2. A device according to claim 1, wherein said means for removing said light fractions comprises a suction tube disposed within the hollow portions of said profiles.

3. A device according to claim 1, wherein said means for removing said light fractions comprises a central tube provided with suction openings disposed between said profiles and a suction tube disposed within said central tube.

4. A device according to claim 1, wherein the distance between the outer surfaces of each profile member and the inner surfaces of said cylindrical chamber is circumferentially varied to create pulsations in the gaseous mixture flowing between said surfaces.

* * * * *